United States Patent
Lee et al.

(10) Patent No.: US 12,427,363 B2
(45) Date of Patent: Sep. 30, 2025

(54) FITNESS DEVICE MOUNTED IN VEHICLE SEAT

(71) Applicants: Hyundai Motor Company, Seoul (KR); Kia Corporation, Seoul (KR)

(72) Inventors: Baek Hee Lee, Gyeonggi-do (KR); Sang Ji Moon, Gyeonggi-do (KR); Won Seok Lee, Gyeonggi-do (KR); Yo Seob Lee, Incheon (KR); Kang Yen Lee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 87 days.

(21) Appl. No.: 18/407,018

(22) Filed: Jan. 8, 2024

(65) Prior Publication Data
US 2025/0090892 A1  Mar. 20, 2025

(30) Foreign Application Priority Data
Sep. 15, 2023 (KR) .................. 10-2023-0122839

(51) Int. Cl.
*A63B 21/00* (2006.01)
*A63B 21/04* (2006.01)
(Continued)

(52) U.S. Cl.
CPC ...... *A63B 21/153* (2013.01); *A63B 21/00069* (2013.01); *A63B 21/00192* (2013.01);
(Continued)

(58) Field of Classification Search
CPC .............. A63B 21/153; A63B 21/4035; A63B 21/00069; A63B 21/000192;
(Continued)

(56) References Cited

U.S. PATENT DOCUMENTS 6,159,133 A * 12/2000 Shugg .............. A63B 23/03508
482/121
11,612,781 B1 * 3/2023 Eoff ........................ A47C 1/022
482/130

(Continued)

FOREIGN PATENT DOCUMENTS

KR 10-2020-0130886 A 11/2020
KR 10-2020-0138541 A 12/2020
KR 10-2021-0008653 A 1/2021

*Primary Examiner* — Christopher E Dunay
(74) *Attorney, Agent, or Firm* — Fox Rothschild LLP

(57) ABSTRACT

Disclosed is a fitness device mounted in a vehicle seat, the device configured to provide a passenger with various exercise effects during long distance traveling of an automotive vehicle and to relieve boredom and muscle fatigue caused by lack of body movement, and including a seatback having opposite side portions to which armrests are rotatably mounted, respectively, at least two belt entry and exit devices mounted within an internal space in the seatback, each of the belt entry exit devices being configured to allow a belt to be pulled out from and introduced into the seatback, and a handle portion detachably mounted to a front end portion of the armrest and to which the belt pulled out from each of the belt entry and exit devices is connected by passing through the inside of each of the armrests.

16 Claims, 12 Drawing Sheets

(51) Int. Cl.
*A63B 23/035* (2006.01)
*B60N 2/90* (2018.01)

(52) U.S. Cl.
CPC ...... *A63B 21/0435* (2013.01); *A63B 21/4035* (2015.10); *A63B 23/03541* (2013.01); *A63B 23/0355* (2013.01); *B60N 2/90* (2018.02); *A63B 2208/0233* (2013.01)

(58) Field of Classification Search
CPC .......... A63B 21/0435; A63B 23/03541; A63B 23/0355; B60N 2/90
USPC ....................................................... 482/130
See application file for complete search history.

(56) References Cited

U.S. PATENT DOCUMENTS

| | | | | |
|---|---|---|---|---|
| 2009/0212609 | A1* | 8/2009 | Mattedi ................. | A63B 23/12 297/217.1 |
| 2012/0065039 | A1* | 3/2012 | Alessandri ......... | A63B 21/0552 482/142 |
| 2014/0209399 | A1* | 7/2014 | Mireshghi ........ | A63B 23/03533 482/121 |
| 2015/0238800 | A1* | 8/2015 | Henry .............. | A63B 23/03541 482/123 |
| 2021/0219731 | A1* | 7/2021 | Chen ..................... | A47C 9/002 |

* cited by examiner

FITNESS DEVICE MOUNTED IN VEHICLE SEAT

CROSS-REFERENCE TO RELATED APPLICATION

This application claims, under 35 U.S.C. § 119(a), the benefit of Korean Patent Application No. 10-2023-0122839, filed on Sep. 15, 2023, the entire contents of which are incorporated herein by reference.

BACKGROUND

Technical Field

The present disclosure relates to a fitness device mounted in a vehicle seat, and more particularly to a fitness device mounted in a vehicle seat and armrests to allow a passenger seated in the seat to perform various muscle strength exercises.

Background

In an autonomous vehicle capable of traveling without driver's control, passengers aboard may take various desired postures for multi-party meetings and conversations, outside scenery viewing, reading, resting, sleeping, and the like in a state of sitting in seats.

To this end, in addition to the basic seat mechanisms for adjusting the front and rear position of the seat, adjusting the vertical height of the seat, and tilting the seat cushion, seat mechanisms for allowing passengers to take various postures are being developed. However, while long distance traveling, passengers have no choice but to maintain a static posture within a limited interior space, so they are bound to feel stuffy and bored.

For example, passengers taking a long distance trip in an autonomous vehicle spend most of their time within a limited space using smartphones, viewing the outside scenery, reading, and using computers while maintaining a static posture, which leads to lack of body movement and causes boredom and muscle fatigue.

The above information disclosed in this Background section is only for enhancement of understanding of the background of the present disclosure, and therefore it may contain information that does not form the prior art that is already known to a person of ordinary skill in the art.

SUMMARY

The present disclosure has been made in an effort to solve the above-described problems associated with the prior art, and it is an object of the present disclosure to provide a fitness device mounted in a vehicle seat, wherein the fitness device is mounted in the vehicle seat and armrests to allow a passenger seated in the seat to perform various muscle strength exercises, providing the passenger with various exercise effects during long distance traveling of an automotive vehicle and relieving boredom and muscle fatigue caused by lack of body movement.

In one aspect, the present disclosure provides a fitness device mounted in a vehicle seat, the device including a seatback having opposite side portions to which armrests are rotatably mounted, respectively, at least two belt entry and exit devices mounted within the internal space in the seatback, each of the belt entry exit devices being configured to allow a belt to be pulled out from and introduced into the seatback, and a handle portion detachably mounted to a front end portion of each of the armrests and to which the belt pulled out from each of the belt entry and exit devices is connected by passing through the inside of each of the armrests.

In a preferred embodiment, the belt entry and exit device may include a case having formed therein a belt entrance at one side portion thereof and mounted within the internal space in the seatback, a drum on which the belt is wound and rotatably mounted to a fixed shaft mounted within the case, and a coil spring having an inner end portion connected to the fixed shaft and having an outer end portion connected to the drum.

In another preferred embodiment, the drum may have one surface having formed therein a spring seating groove into which the coil spring is inserted and seated.

In still another preferred embodiment, the seatback and the case may further mount thereto a belt tension adjustment device configured to provide rotational resistance to the drum to adjust a tension force of the belt.

In yet another preferred embodiment, the belt tension adjustment device may include an adjustment bar having one end portion hinged to the case while maintaining a predetermined distance from the outer diameter portion of the drum, a magnet mounted on the inner surface of the adjustment bar and configured to provide the drum with rotational resistance generated by magnetism, a tension adjustment dial mounted on the outer surface of the seatback, a winding roll rotatably disposed at the inner side of a seatback frame mounted within the seatback, a connection shaft configured to connect the tension adjustment dial to the winding roll by passing through the seatback frame, and a wire having one end portion fixed by being wound on the winding roll and having another end portion connected to another end portion of the adjustment bar.

In still yet another preferred embodiment, the seatback frame may mount thereto an elastic ball supported by a spring, and the connection shaft may have a circumferential portion having formed therein a plurality of locking grooves, at equal intervals, into which the elastic ball is inserted.

In a further preferred embodiment, the handle portion may further mount thereto a grip device held by a user's hand.

In another further preferred embodiment, according to one embodiment of the present disclosure, the grip device may be rod-shaped, triangle-shaped, or square shaped. The grip device may include a male thread portion. Here, the handle portion may have a rear surface portion having formed therein a female thread portion into which the male thread portion is detachably screwed.

In still another further preferred embodiment, according to a different embodiment of the present disclosure, the grip device may include an upper link having one end portion hinged to the upper portion of the handle portion and having another end portion provided with a first grip bar, a first return spring mounted to the hinge point of the upper link and configured to provide the upper link with an elastic restoring force for upward rotation, a seesaw link having one end portion provided with a locking hook, having another end portion provided with a second grip bar, and having a middle portion hinged within the handle portion, and a second return spring mounted to the hinge point of the seesaw link and configured to provide the one end portion of the seesaw link with an elastic restoring force for downward rotation and at the same time to provide the other end portion of the seesaw link with an elastic restoring force for upward rotation.

In yet another further preferred embodiment, the handle portion may further mount a sliding cover at the upper surface portion thereof.

In a still further preferred embodiment, each of the armrests and the handle portion may further mount thereto a locking device configured to lock or unlock the handle portion.

In a yet still further preferred embodiment, the locking device may include a button pressably mounted to the lower portion of each of the armrests, a locking link having a middle portion hinged within each of the armrests, having one end portion connected to the button, and having another end portion from which a locking protrusion protrudes, a support spring configured to connect one end portion of the locking link to an inner frame of each of the armrests, and a locking ring mounted to the rear surface portion of the handle portion and allowing the locking protrusion of the locking link to be detachably inserted thereinto.

Each of the armrests may be configured to rotate between about −90° (a front end of the armrest facing down) and about +90° (a front end of the armrest facing down). Each of the armrests may be configured to lock at an angle between about −90° and about +90°.

In another exemplary embodiment, a fitness device mounted in a vehicle seat is provided. The device may include a seatback having a side portion to which an armrest is rotatably mounted; a belt entry and exit device mounted within an internal space in the seatback, the belt entry exit device being configured to allow a belt to be pulled out from and introduced into the seatback; and a handle portion detachably mounted to a front end portion of the armrest, and to which the belt pulled out from the belt entry and exit device is connected by passing through an inside of the armrests.

In another exemplary embodiment, a fitness device mounted in a vehicle seat is provided. The device may include a seatback having a side portion to which an armrest is rotatably mounted; and a belt entry and exit device mounted within an internal space in the seatback, the belt entry exit device being configured to allow a belt to be pulled out from and introduced into the seatback.

As discussed, the method and system suitably include use of a controller or processer.

In another embodiment, vehicles are provided that comprise an apparatus as disclosed herein.

Other aspects and preferred embodiments of the present disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
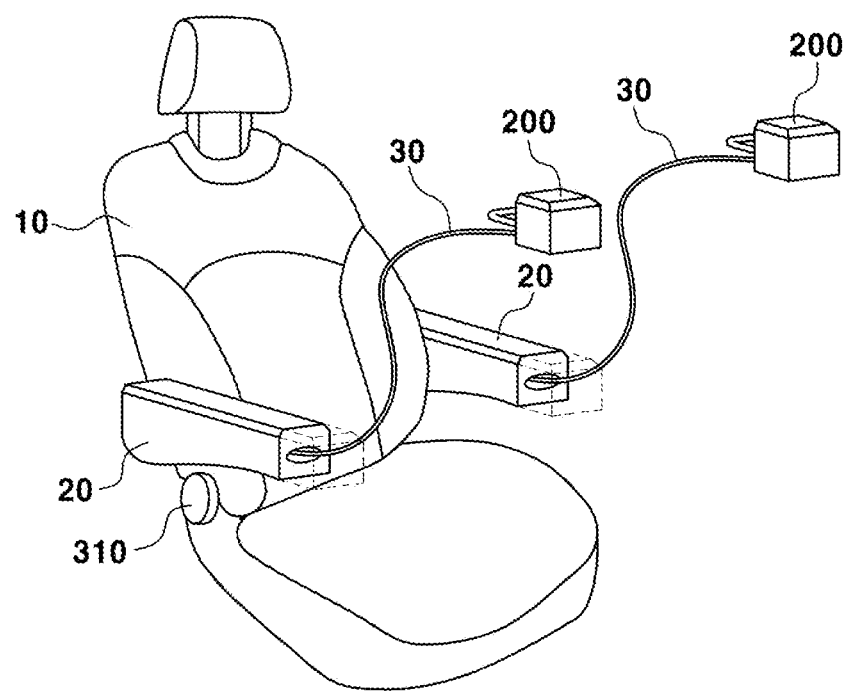
FIG. 1 is a perspective view illustrating the appearance of a vehicle seat having a fitness device according to the present disclosure.

It should be understood that the appended drawings are not necessarily to scale, presenting a somewhat simplified representation of various preferred features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Descriptions of specific structures or functions presented in the embodiments herein are merely exemplary for the purpose of explaining the embodiments according to the concept of the present disclosure, and the embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

Terms such as "first" and/or "second" herein may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It should be understood that, when a component is referred to as being "connected to" another component, the component may be directly connected to the other component, or intervening components may also be present. In contrast, when a component is referred to as being "directly connected to" another component, there is no intervening component present. Other terms used to describe relationships between components should be interpreted in a like fashion (e.g., "between" versus "directly between," "adjacent" versus "directly adjacent," etc.).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Throughout the specification, like reference numerals indicate like components. The terminology used herein is for the purpose of illustrating embodiments and is not intended to limit the present disclosure.

Hereinafter, a preferred embodiment of present disclosure will be described in detail with reference to the attached drawings.

Figure 2:
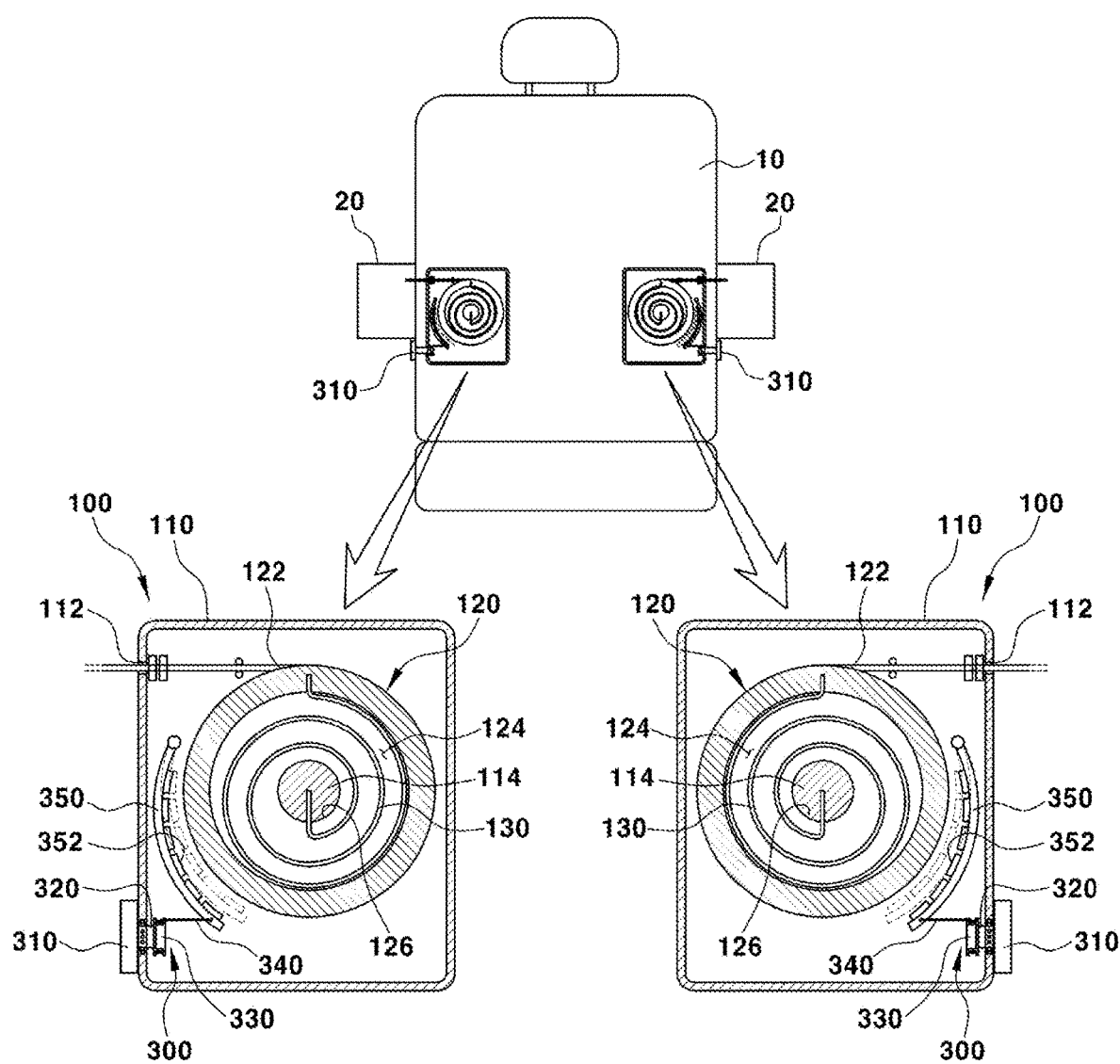
FIG. 2 is a front view illustrating belt entry and exit devices and belt tension adjustment devices, which are components of a fitness device mounted in a vehicle seat according to the present disclosure, mounted in a seatback.
Figure 3:
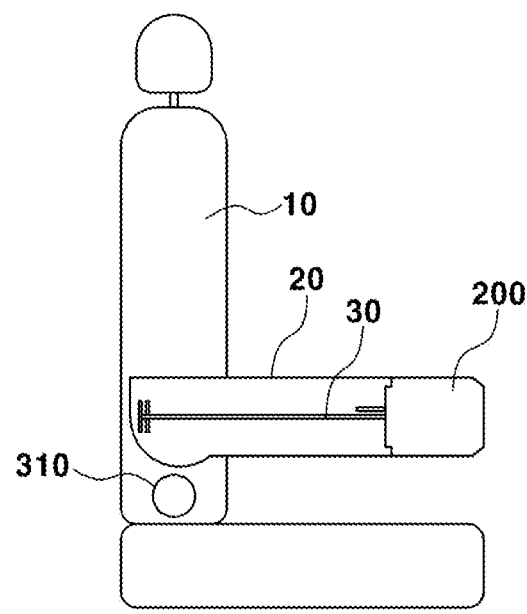
FIG. 3 is a side view illustrating a wire pulled out from a belt entry and exit device, which is a component of a fitness device mounted in a vehicle seat according to the present disclosure, and connected to a handle portion by passing through the inside of an armrest.

FIG. 1 is a perspective view illustrating the appearance of a vehicle seat having a fitness device according to the present disclosure, FIG. 2 is a front view illustrating belt entry and exit devices and belt tension adjustment devices, which are components of a fitness device mounted in a vehicle seat according to the present disclosure, mounted in a seatback, and FIG. 3 is a side view illustrating a wire pulled out from a belt entry and exit device, which is a component of a fitness device mounted in a vehicle seat according to the present disclosure, and connected to a handle portion by passing through the inside of an armrest. Here, reference numeral 10 in each figure denotes a seatback.

The seatback 10 is configured to allow a passenger in a vehicle to lean his or her upper body against thereto and has opposite side portions to which armrests 20 configured to allow the passenger to place his or her arms thereon are rotatably mounted, respectively.

The seatback 10 has an internal space where at least two belt entry and exit devices 100 are installed. The belt entry and exit device 100 is configured to allow a belt 30 for muscle training to be pulled out into the armrest 20 mounted to the external side of the seatback 10, or to allow the pulled out belt 30 to be re-introduced into the internal space in the seatback 10.

To this end, the belt entry and exit device 100 may have formed therein a belt entrance 112 at one side portion thereof. The belt entry and exit device 100 may include a case 110 mounted to a seatback frame provided within the seatback 10, a metal drum 120 rotatably mounted within the case 110, and a coil spring 130 configured to provide an elastic restoring force to the drum 120 when the drum 120 rotates in one direction.

The drum 120 has an outer diameter portion having formed therein a belt winding groove 122 in which one end portion of the belt 30 is fixed and wound, the drum 120 has one surface having formed therein a spring seating groove 124 into which the coil spring 130 is inserted and seated, and the drum 120 has a central portion having formed therein a rotation support hole 126 into which a fixed shaft 114 mounted within the case 110 is inserted.

Here, in a state in which the coil spring 130 is inserted and seated in the spring seating groove 124 in the drum 120, an inner end portion and an outer end portion of the coil spring 130 are fixed to the fixed shaft 114 and to the inner circumferential portion of the drum 120, respectively.

Meanwhile, another end portion of the belt 30 pulled out from the belt entry and exit device 100 passes through the inside of the armrest 20 and is connected to a rear surface portion of a handle portion 200 detachably mounted to a front end portion of the armrest 20.

The handle portion 200 may be lockably and unlockably mounted to the front end portion of the armrest 20 using a locking device 230.

Figure 5A:
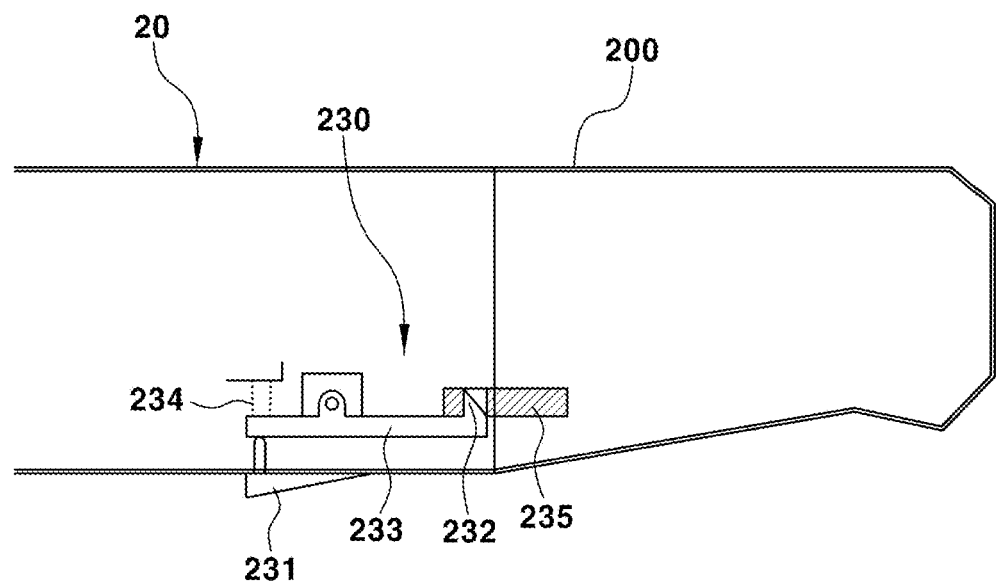
FIG. 5A and FIG. 5B are cross-sectional views illustrating a locking device for a handle portion, which is a component of a fitness device mounted in a vehicle seat according to the present disclosure.
Figure 5B:
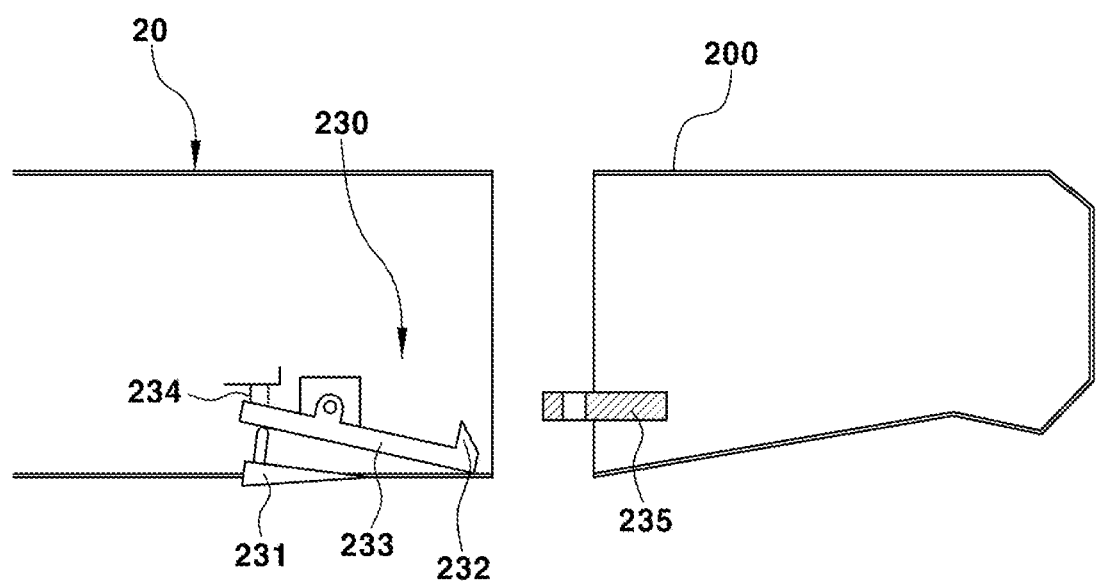

To this end, the locking device 230 may include, as illustrated in FIG. 5A and FIG. 5B, a button 231 pressably mounted to a lower portion of the armrest 20, a locking link 233 having a middle portion hinged within the armrest 20, having one end portion connected to the button 231, and having another end portion from which a locking protrusion 232 protrudes, a support spring 234 configured to connect the one end portion of the locking link 233 to an inner frame of the armrest 20, and a locking ring 235 mounted to the rear surface portion of the handle portion 200, allowing the locking protrusion 232 of the locking link 233 to be detachably inserted into the locking ring 235.

Accordingly, when a user presses the button 231, the one end portion of the locking link 233 moves up while compressing the support spring 234, and at the same time, the other end portion of the locking link 233 moves down so that the locking protrusion 232 of the locking link 233 is detached from the locking ring 235, allowing the handle portion 200 to be unlocked and separated from the armrest 20.

As the user pulls the belt 30 while holding the handle portion 200 after separating the handle portion 200 as above, the belt 30 is pulled out through the belt entrance 112 in the case 110, and the drum 120 rotates in a belt exit direction and at the same time the coil spring 130 is compressed. Conversely, when the pulling force on the belt 30 is released, the drum 120 rotates in a belt entry direction and at the same time the belt 30 is re-wound on the drum 120 due to the elastic restoring force of the coil spring 130.

The handle portion 200 may be further equipped with a grip device 210, 220 that a user may hold with his or her hand.

Figure 4A:
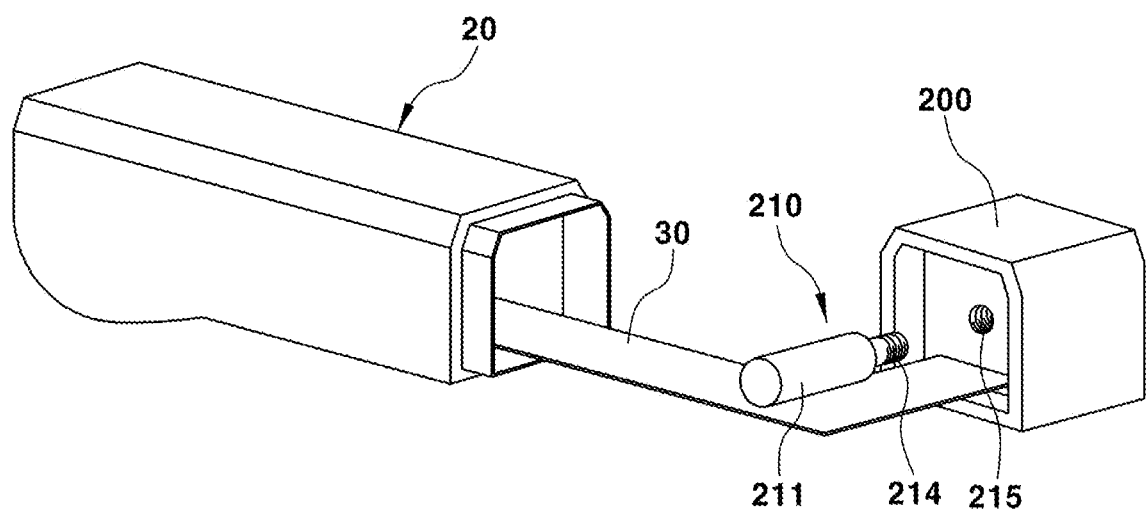
FIG. 4A, FIG. 4B, and FIG. 4C illustrate one embodiment of a grip device of a handle portion, which is a component of a fitness device mounted in a vehicle seat according to the present disclosure, detachably mounted to a front end portion of an armrest.
Figure 4B:
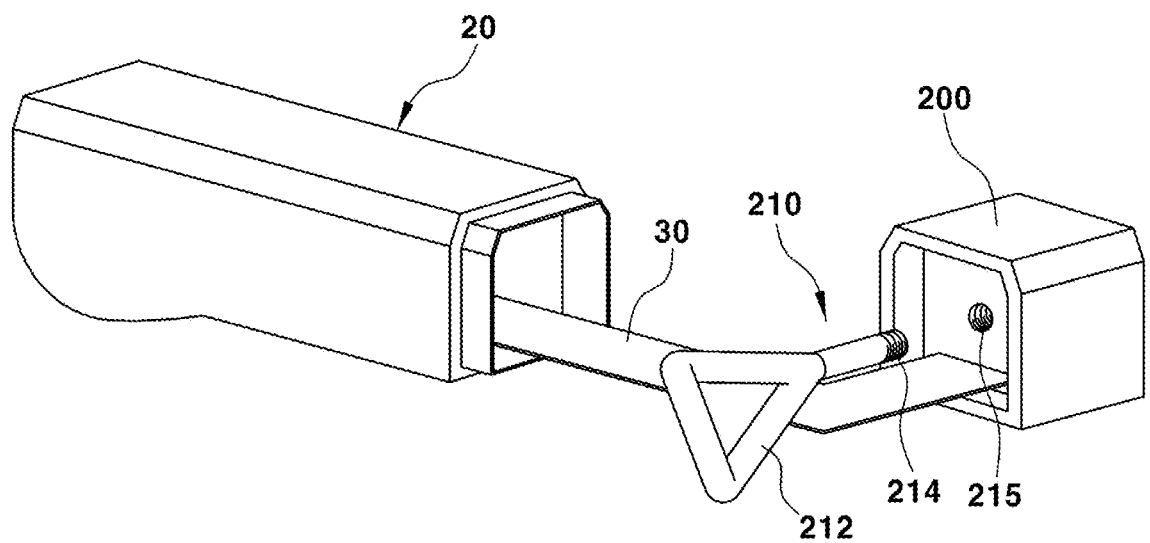
Figure 4C:
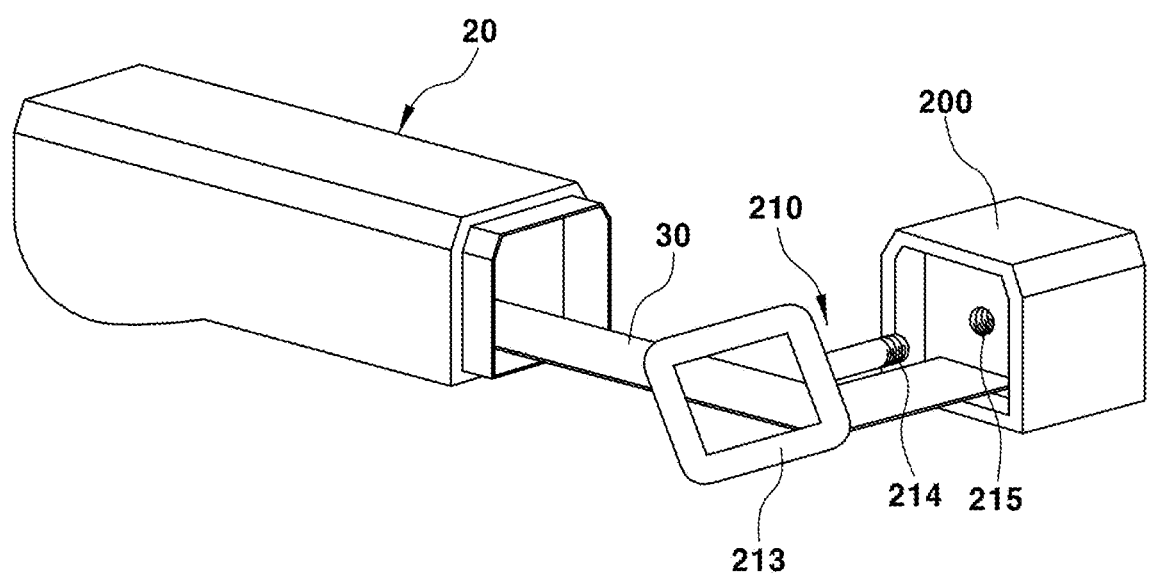

The grip device 210 according to one embodiment of the present disclosure may include a rod-shaped grip 211 having one end portion including a male thread portion 214 as illustrated in FIG. 4A, a triangular grip 212 having one end portion including a male thread portion 214 as illustrated in FIG. 4B, and a square grip 213 having one end portion including a male thread portion 214 as illustrated in FIG. 4C. Here, the rear surface portion of the handle portion 200 may include a female thread portion 215 into which the male thread portion 214 of any one of the rod-shaped grip 211, the triangular grip 212, and the square grip 213 is inserted.

Accordingly, the user may select one of the rod-shaped grip 211, the triangular grip 212, and the square grip 213 depending on the type of muscle training or depending on how the user wants to grab the grip and fasten the same to the handle portion 200.

After the user separates the handle portion 200 from the armrest 20, the user may pull the belt 30 while grabbing one of the rod-shaped grip 211, the triangular grip 212, and the square grip 213 selectively fastened to the handle portion 200.

Figure 6A:
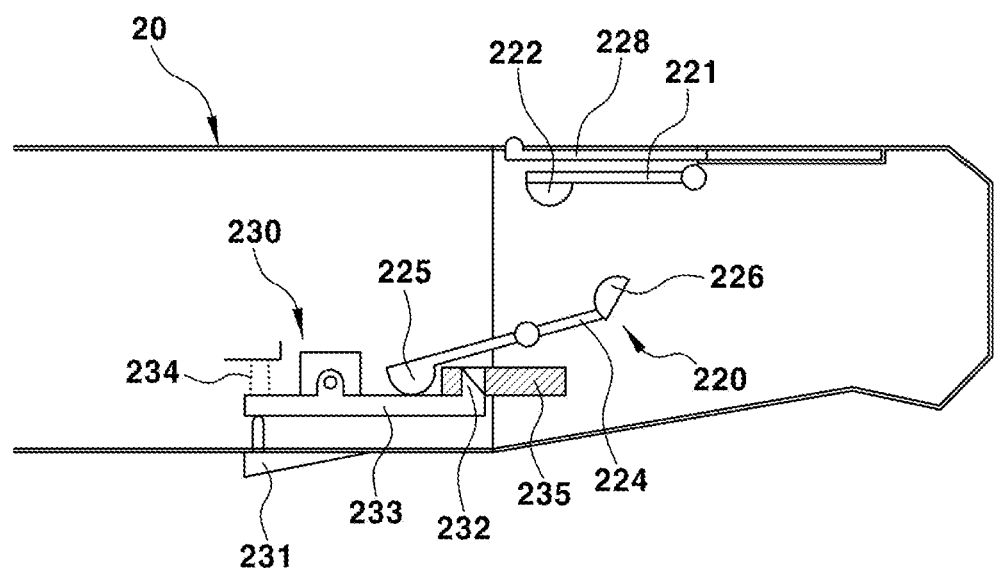
FIG. 6A and FIG. 6B are cross-sectional views illustrating a different embodiment of a grip device of a handle portion, which is a component of a fitness device mounted in a vehicle seat according to the present disclosure, detachably mounted to a front end portion of an armrest.
Figure 6B:
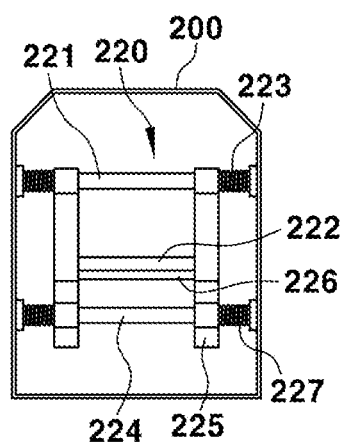

The grip device 220 according to a different embodiment of the present disclosure may include, as illustrated in FIG. 6A and FIG. 6B, an upper link 221, a first return spring 223, a seesaw link 224, and a second return spring 227.

The upper link 221 has one end portion hinged to an upper portion of the handle portion 200 and has another end portion provided with a first grip bar 222 which may be held by a user's hand.

The first return spring 223 is mounted to the hinge point of the upper link 221 and is configured to provide the upper link 221 with an elastic restoring force for upward rotation.

The seesaw link 224 has one end portion provided with a locking hook 225 lockably coupled to the locking device 230 mounted to the armrest 20, has another end portion provided with a second grip bar 226 held by a user's hand, and has a middle portion hinged within the handle portion 200.

Here, when the locking protrusion 232 is inserted into and locked in the locking ring 235 mounted at the rear surface portion of the handle portion 200 in a state in which the locking hook 225 of the seesaw link 224 is, as illustrated in FIG. 6A, seated on the locking protrusion 232 of the locking link 233 which is the component of the locking device 230, the handle portion 200 is coupled to the armrest 20.

The second return spring 227 is mounted to the hinge point of the seesaw link 224 and is configured to provide the one end portion of the seesaw link 224 with an elastic restoring force for downward rotation and at the same time to provide the other end portion of the seesaw link 224 with an elastic restoring force for upward rotation.

Preferably, the upper surface portion of the handle portion 200 may further mount thereto a sliding cover 228 configured to cover the upper link 221, the seesaw link 224, etc. so as to hide the same from the outside.

Figure 7A:
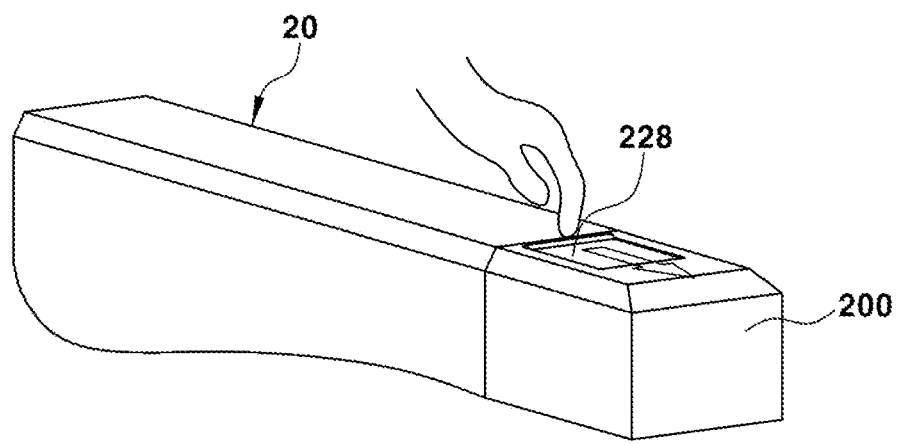
FIG. 7A to FIG. 7C are cross-sectional views illustrating the process of detaching and using the handle portion illustrated in FIG. 6A and FIG. 6B.

With this structure, the user slides and opens the sliding cover 228 as illustrated in FIG. 7A, and then pushes the upper link 221 downward.

Figure 7B:
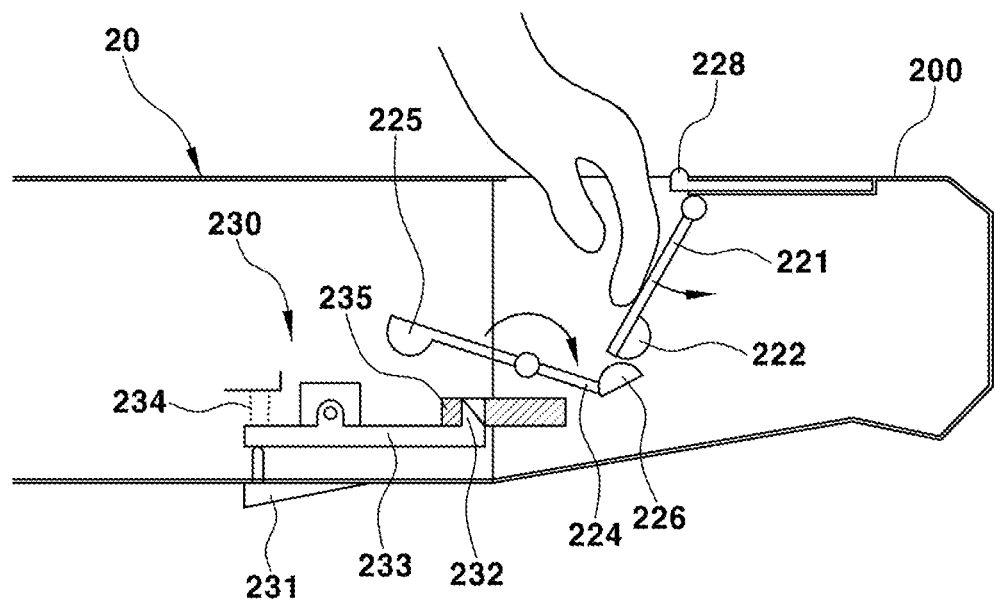

When the upper link 221 is pushed downward, the first grip bar 222 of the upper link 221 pushes the second grip bar 226 of the seesaw link 224 as illustrated in FIG. 7B, allowing the seesaw link 224 to rotate such that the one end portion thereof moves upward and the other end portion thereof moves downward.

Figure 7C:
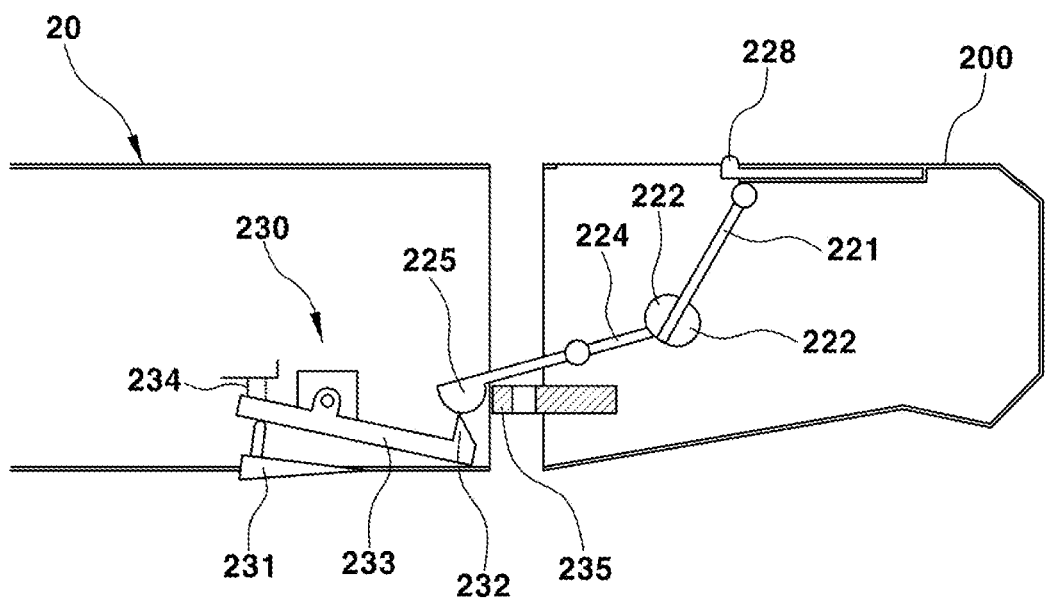

Here, when the upper link 221 is pushed downward, the first grip bar 222 of the upper link 221 slides over the second grip bar 226 of the seesaw link 224 as illustrated in FIG. 7C.

Thereafter, the first return spring 223 provides an elastic restoring force for upward rotation to the upper link 221, allowing the first grip bar 222 of the upper link 221 and the second grip bar 226 of the seesaw link 224 to overlap each other.

Next, the user may put his or her hand into the handle portion 200, grab the first grip bar 222 and the second grip bar 226 which overlap each other, and pull out the belt 30.

Meanwhile, the seatback 10 and the case 110 may further mount thereto a belt tension adjustment device 300 configured to provide the drum 120 with rotational resistance generated by magnetism to adjust the tension force of the belt 30.

Figure 8:
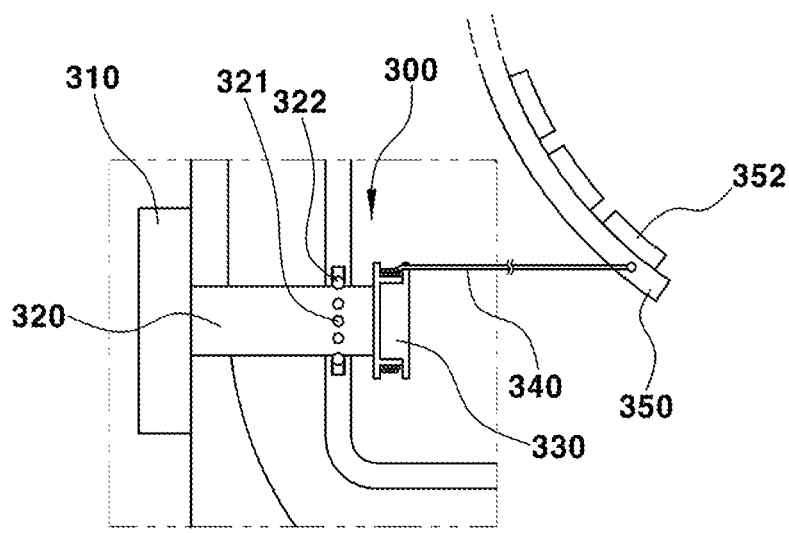
FIG. 8 is an enlarged cross-sectional view illustrating a main portion of the belt tension adjustment device illustrated in FIG. 2.

To this end, the belt tension adjustment device 300 may include, as illustrated in FIG. 2 and FIG. 8, a tension adjustment dial 310 mounted on an outer surface of the seatback 10, a winding roll 330 rotatably disposed at an inner side of a seatback frame 12 mounted within the seatback 10, a connection shaft 320 configured to connect the tension adjustment dial 310 to the winding roll 330 by passing through the seatback frame 12, a curved adjustment bar 350 having one end portion hinged to the case 110 while maintaining a predetermined distance from the outer diameter portion of the drum 120, a magnet 352 mounted on an inner surface of the adjustment bar 350 and configured to provide the drum 120 with rotational resistance generated by the magnetism, and a wire 340 having one end portion fixed by being wound on the winding roll and having another end portion connected to another end portion of the adjustment bar 350.

Moreover, the seatback frame 12 may mount thereto an elastic ball 322 supported by a spring, and the circumferential portion of the connection shaft 320 may include a plurality of locking grooves 321, formed at equal intervals, into which the elastic ball 322 is inserted.

Here, when the user rotates the tension adjustment dial 310 in one direction or in another direction, the elastic ball 322 is inserted into one of the locking grooves 321 in the connection shaft 320, so that the rotation amount of the tension adjustment dial 310 and the winding roll 330 may be adjusted.

Accordingly, when the user rotates the tension adjustment dial 310 in the one direction, the winding roll 330 coaxially connected the tension adjustment dial 310 via the connection shaft 320 also rotates in the same direction, pulling the wire 340 and winding the same on the winding roll 330.

Subsequently, the other end portion of the adjustment bar 350 rotates outward by the pulling force of the wire 340, and the magnet 352 attached to the adjustment bar 350 moves away from the drum 120.

As the magnet 352 attached to the adjustment bar 350 moves away from the drum 120, the rotational resistance generated by the magnetism of the magnet 352 acting on the drum 120 may be reduced and accordingly the tension force generated when pulling the belt 30, wound on the drum 120, may be reduced.

Conversely, when the user rotates the tension adjustment dial 310 in the other direction, the winding roll 330 coaxially connected to the tension adjustment dial 310 via the connection shaft 320 also rotates in the same direction, allowing the wire 340 to be unwound from the winding roll 330.

Subsequently, in the state in which the wire 340 may be unwound from the winding roll 330, the other end portion of the adjustment bar 350 rotates inward by the magnetism of the magnet 352 which makes the magnet 352 to come into contact with the surface of the drum 120, so that the magnet 352 attached to the adjustment bar 350 may be positioned close to the drum 120.

As the magnet 352 attached to the adjustment bar 350 is positioned close to the drum 120, the rotational resistance generated by the magnetism of the magnet 352 acting on the drum 120 may be increased and accordingly the tension force generated when pulling the belt 30, wound on the drum 120, may be increased.

Here, the operation flow of the fitness device of the present disclosure having the above structure is as follows.

First, the handle portion 200 is separated from the armrest 20.

To this end, when the user pushes the button 231 as described above, the one end portion of the locking link 233 moves up while compressing the support spring 234, and at the same time, the other end portion of the locking link 233 moves down so that the locking protrusion 232 of the locking link 233 is detached from the locking ring 235, allowing the handle portion 200 to be unlocked and separated from the armrest 20.

Subsequently, after the user separates the handle portion 200 from the armrest 20, the user may pull the belt 30 while grabbing one of the rod-shaped grip 211, the triangular grip 212, and the square grip 213 selectively fastened to the handle portion 200.

Alternatively, as described above, the user may put his or her hand into the handle portion 200, grab the first grip bar 222 and second grip bar 226 which overlap each other, and then pull out the belt 30.

Figure 9A:
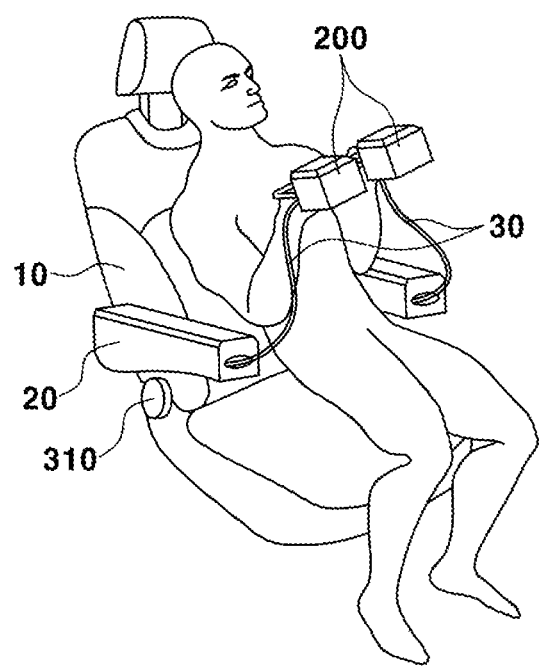
FIG. 9A to FIG. 9F are schematic views illustrating examples of a passenger performing muscle training using a fitness device mounted in a vehicle seat according to the present disclosure.
Figure 9B:
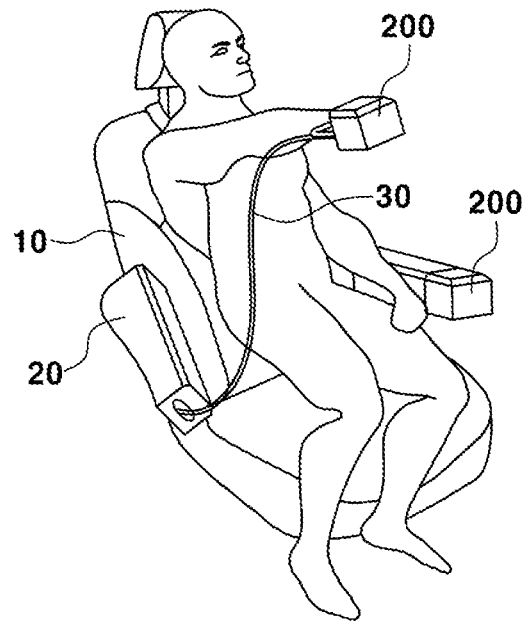
Figure 9C:
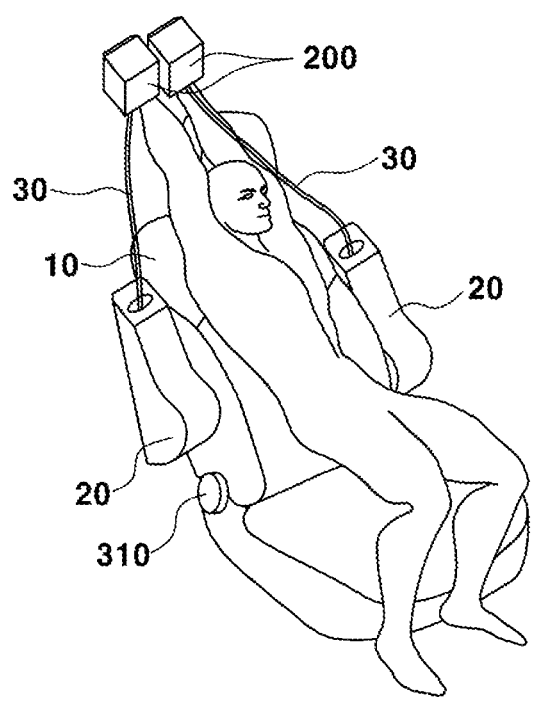
Figure 9D:
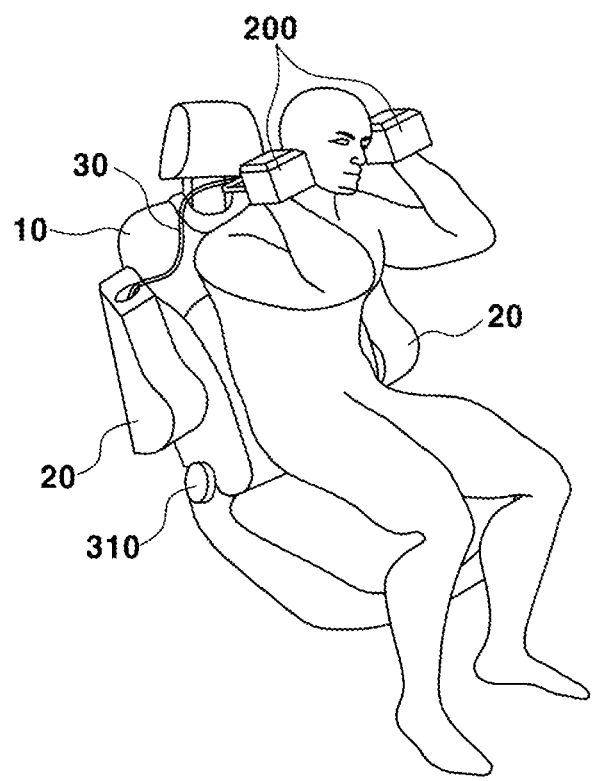

In this way, the user may perform biceps exercises by pulling the belts 30 while grabbing the handle portions 200 with both hands as illustrated in FIG. 9A, or perform shoulder exercises or triceps exercises by lifting both arms as illustrated in FIG. 9B and FIG. 9C, or perform abdominal exercises by moving his or her upper body as illustrated in FIG. 9D.

Figure 9E:
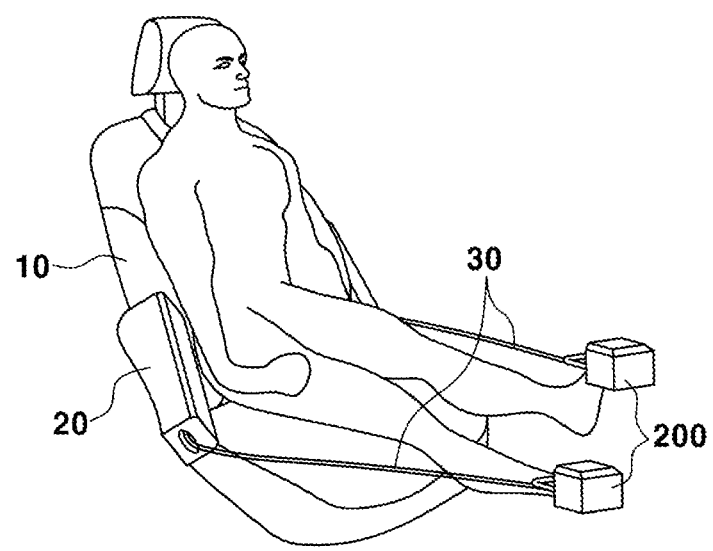
Figure 9F:
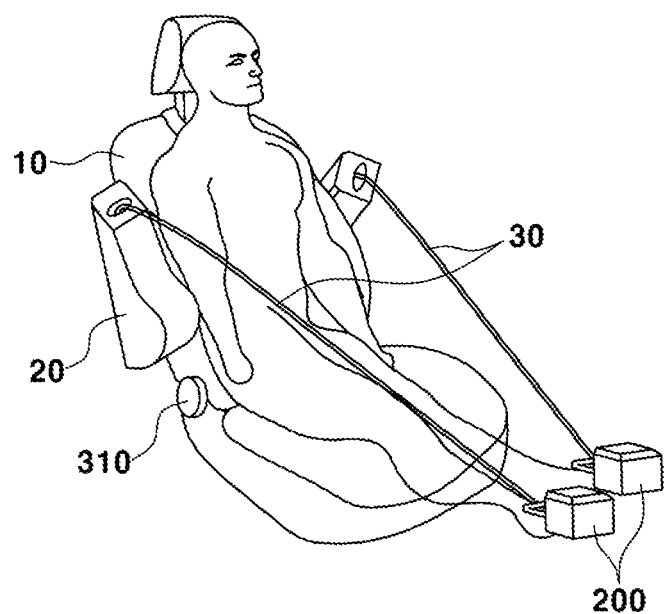

Moreover, the user may exercise the thigh or calf muscles, as illustrated in FIG. 9E and FIG. 9F, by fastening the square grip 213 to the handle portion 200 and inserting his or her feet into the square grips 213.

Here, when the user rotates the tension adjustment dial 310 in the one direction or in the other direction as described above, the tension force generated when pulling the belt 30 may be reduced or increased.

To elaborate, as described above, the rotational resistance generated by the magnetism of the magnet 352 acting on the drum 120 may be decreased and at the same time the tension force generated when pulling the belt 30, wound on the drum 120, may be decreased, or the rotational resistance generated by the magnetism of the magnet 352 acting on the drum 120 may be increased and at the same time the tension force generated when pulling the belt 30, wound on the drum 120, may be increased, allowing the user to perform exercises that suit the user's strength level.

As such, by allowing the passenger seated in the seat to perform various muscle strength exercises using the fitness device mounted in the seatback and armrest, the passenger may be provided with various exercise effects during long distance traveling of an automotive vehicle and may relieve boredom and muscle fatigue caused by lack of body movement. Depending on various muscle strength exercises, the armrest may be capable of rotating and locking at a specific angle that is desirable for the exercise. For example, the armrest may rotate between about −90° (a front end of the armrest facing down) and about +90° (a front end of the armrest facing down). It may be possible to lock the armrest at an angle between about −90° and about +90° to provide a stable exercise setting to the passenger.

As is apparent from the above description, the present disclosure provides the following effects.

Using the fitness device including the belt tension adjustment device mounted to the seatback, the handle portion detachably mounted to the front end portion of the armrest, the belt interconnecting the belt tension adjustment device to the handle portion, the passenger seated in the seat may perform various muscle strength exercises, being provided with various exercise effects during long distance traveling of an automotive vehicle and relieving boredom and muscle fatigue caused by lack of body movement.

Although the present disclosure has been described in detail with reference to one embodiment, the scope of the present disclosure is not limited to the above-described embodiment, and various modifications and improvements by those skilled in the art based on the basic concept of the present disclosure as defined in the claims below will also be included in the scope of the present disclosure.

What is claimed is:
1. A vehicle comprising:
   a fitness device mounted in a vehicle seat, the fitness device comprising:
   a seatback having opposite side portions to which armrests are rotatably mounted, respectively;

at least two belt entry and exit devices mounted within an internal space in the seatback, each of the belt entry exit devices being configured to allow a belt to be pulled out from and introduced into the seatback; and a handle portion detachably mounted to a front end portion of each of the armrests, and to which the belt pulled out from each of the belt entry and exit devices is connected by passing through an inside of each of the armrests.

2. The vehicle of claim 1, wherein each of the belt entry and exit devices comprises:

a case having formed therein a belt entrance at one side portion thereof and mounted within the internal space in the seatback;

a drum on which the belt is wound, and rotatably mounted to a fixed shaft mounted within the case; and a coil spring having an inner end portion connected to the fixed shaft and having an outer end portion connected to the drum.

3. The vehicle of claim 2, wherein the drum has one surface having formed therein a spring seating groove into which the coil spring is inserted and seated.

4. The vehicle of claim 2, wherein the seatback and the case further mount thereto a belt tension adjustment device configured to provide rotational resistance to the drum to adjust a tension force of the belt.

5. The vehicle of claim 4, wherein the belt tension adjustment device comprises:

an adjustment bar having one end portion hinged to the case while maintaining a predetermined distance from an outer diameter portion of the drum;

a magnet mounted on an inner surface of the adjustment bar and configured to provide the drum with rotational resistance generated by magnetism;

a tension adjustment dial mounted on an outer surface of the seatback;

a winding roll rotatably disposed at an inner side of a seatback frame mounted within the seatback;

a connection shaft configured to connect the tension adjustment dial to the winding roll by passing through the seatback frame; and a wire having one end portion fixed by being wound on the winding roll and having another end portion connected to another end portion of the adjustment bar.

6. The vehicle of claim 5, wherein the seatback frame mounts thereto an elastic ball supported by a spring, and the connection shaft has a circumferential portion having formed therein a plurality of locking grooves, at equal intervals, into which the elastic ball is inserted.

7. The vehicle of claim 1, wherein the handle portion further mounts thereto a grip device held by a user's hand.

8. The vehicle of claim 7, wherein the grip device is rod-shaped, triangle-shaped, or square-shaped.

9. The vehicle of claim 7, wherein the grip device comprises a male thread portion, and wherein the handle portion has a rear surface portion having formed therein a female thread portion into which the male thread portion is detachably screwed.

10. The vehicle of claim 7, wherein the grip device comprises:

an upper link having one end portion hinged to an upper portion of the handle portion and having another end portion provided with a first grip bar;

a first return spring mounted to a hinge point of the upper link and configured to provide the upper link with an elastic restoring force for upward rotation;

a seesaw link having one end portion provided with a locking hook, having another end portion provided with a second grip bar, and having a middle portion hinged within the handle portion; and a second return spring mounted to a hinge point of the seesaw link and configured to provide the one end portion of the seesaw link with an elastic restoring force for downward rotation and at the same time to provide the other end portion of the seesaw link with an elastic restoring force for upward rotation.

11. The vehicle of claim 10, wherein the handle portion further mounts a sliding cover at an upper surface portion thereof.

12. The vehicle of claim 1, wherein each of the armrests and the handle portion further mount thereto a locking device configured to lock or unlock the handle portion.

13. The vehicle of claim 12, wherein the locking device comprises:

a button pressably mounted to a lower portion of each of the armrests;

a locking link having a middle portion hinged within each of the armrests, having one end portion connected to the button, and having another end portion from which a locking protrusion protrudes;

a support spring configured to connect one end portion of the locking link to an inner frame of each of the armrests; and a locking ring mounted to a rear surface portion of the handle portion and allowing the locking protrusion of the locking link to be detachably inserted thereinto.

14. The vehicle of claim 1, wherein each of the armrests is configured to rotate between about −90° (a front end of the armrest facing down) and about +90° (a front end of the armrest facing down).

15. The vehicle of claim 1, wherein each of the armrests is configured to lock at an angle between about −90° and about +90°.

16. A vehicle comprising:

a fitness device mounted in a vehicle seat, the fitness device comprising:

a seatback having a side portion to which an armrest is rotatably mounted;

a belt entry and exit device mounted within an internal space in the seatback, the belt entry exit device being configured to allow a belt to be pulled out from and introduced into the seatback; and a handle portion detachably mounted to a front end portion of the armrest, and to which the belt pulled out from the belt entry and exit device is connected by passing through an inside of the armrests.

* * * * *